United States Patent

Koenck et al.

[11] Patent Number: 5,825,045
[45] Date of Patent: Oct. 20, 1998

[54] EXTENDED RANGE HIGHLY SELECTIVE LOW POWER CONSUMING DATA TAG AND INFORMATION DISPLAY SYSTEM

[75] Inventors: Steven E. Koenck; Phillip Miller; George E. Hanson, all of Cedar Rapids, Iowa

[73] Assignee: Norand Corporation, Cedar Rapids, Iowa

[21] Appl. No.: 901,389

[22] Filed: Jul. 28, 1997

Related U.S. Application Data

[60] Continuation of Ser. No. 503,569, Jul. 18, 1995, abandoned, which is a division of Ser. No. 184,636, Jan. 18, 1994, abandoned, which is a continuation-in-part of Ser. No. 836,024, Feb. 13, 1992, abandoned.

[51] Int. Cl.$^6$ ...................................................... G06K 7/10
[52] U.S. Cl. ........................ 250/566; 250/234; 235/380; 235/472
[58] Field of Search ...................................... 250/234, 566, 250/568; 235/472, 380, 382; 340/825.54

[56] References Cited

U.S. PATENT DOCUMENTS

| 4,242,663 | 12/1980 | Slobodin | 235/380 |
| 4,658,147 | 4/1987 | Eldering | 250/566 |
| 5,280,159 | 1/1994 | Schultz et al. | 235/380 |
| 5,382,784 | 1/1995 | Eberhardt | 235/472 |

*Primary Examiner*—Edward P. Westin
*Assistant Examiner*—Kevin Pyo
*Attorney, Agent, or Firm*—Suiter & Associates PC

[57] ABSTRACT

An information transducing system including a data tag for digitally storing data and a tag reader for selectively activating data tags such that a terminal may at least receive the digitally stored data in a selected data tag for storage and/or transmission of the digitally stored data in the data tag. The tag reader may be operated so as to transmit a unidirectional beam of radiant energy such that it impinges on a data tag to be read. The radiant energy radiating from the tag reader activates the data tag causing the data tag to transmit its digitally stored data via radiant energy to the tag reader and/or a terminal operably coupled to the tag reader.

17 Claims, 3 Drawing Sheets

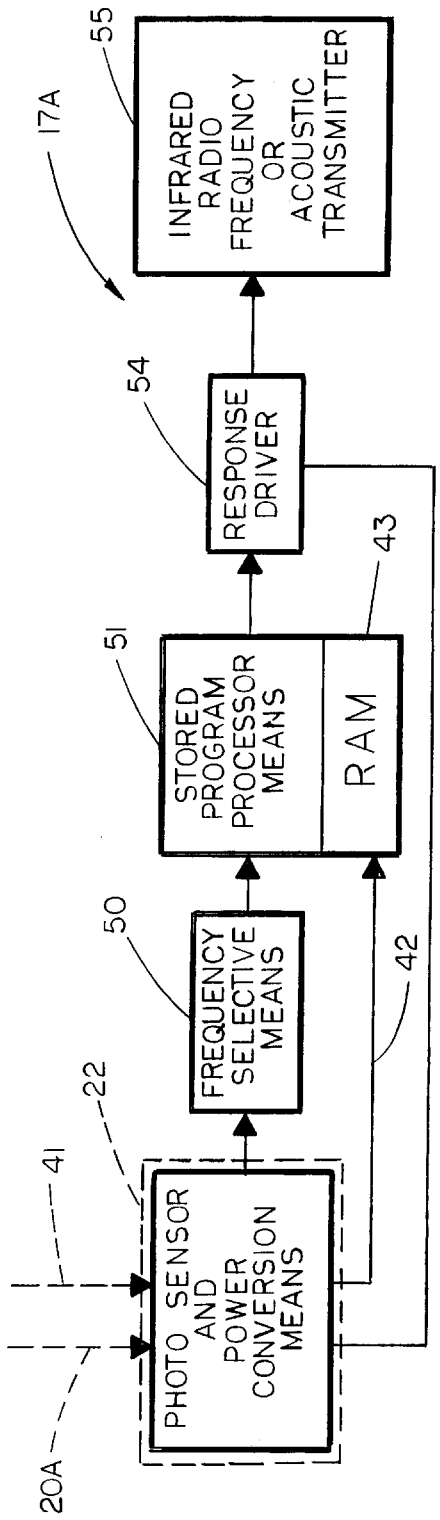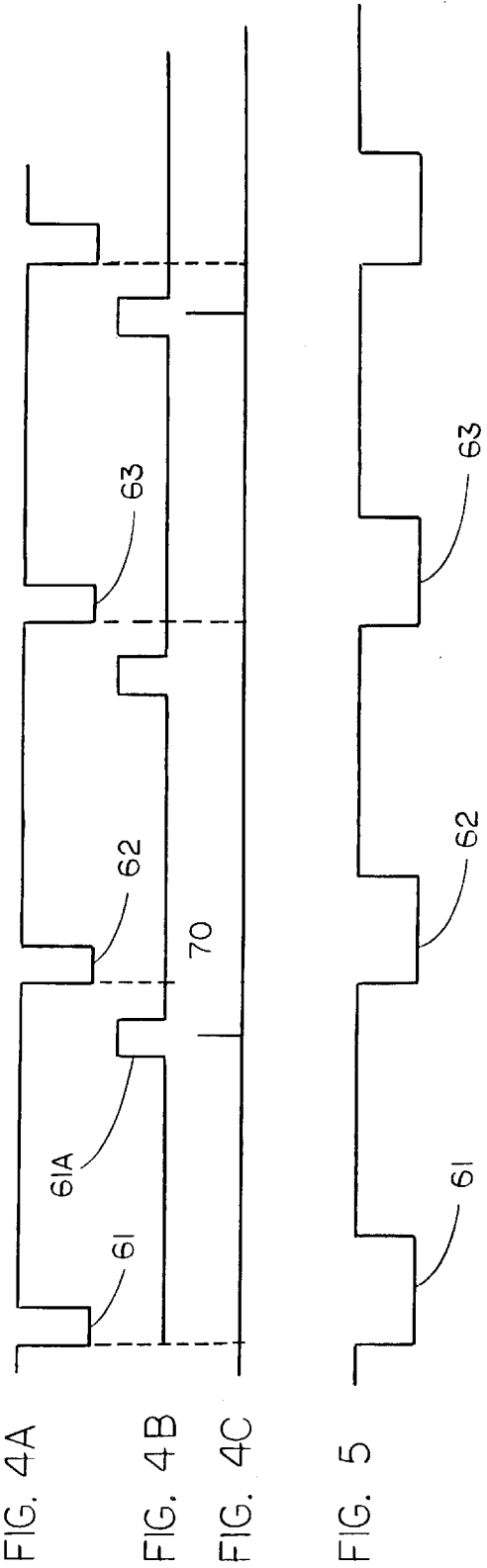

EXTENDED RANGE HIGHLY SELECTIVE LOW POWER CONSUMING DATA TAG AND INFORMATION DISPLAY SYSTEM

CROSS REFERENCES TO RELATED APPLICATIONS

The present application is a continuation of application Ser. No. 08/503,569, filed Jul. 18, 1995, now abandoned, which is a divisional of application Ser. No. 08/184,636, filed Jan. 18, 1994, now abandoned; which is a continuation-in-part of application Ser. No. 07/836,024, filed Feb. 13, 1992, now abandoned.

The said application Ser. No. 08/184,636 is related to application Ser. No. 07/880,114, filed May 7, 1992, now U.S. Pat. No. 5,280,159, issued Jan. 18, 1994; which is continuation-in-part of application Ser. No. 07/321,932, filed Mar. 9, 1989, now abandoned. All of these documents, including drawings and appendices, are incorporated herein by this reference.

TECHNICAL FIELD

This invention relates to the field of automatic identification, and particularly to solid state records such as so called tags which may store data which can be interrogated or modified via a wireless link, typically with the use of a hand-held device.

BACKGROUND ART

Bar codes are useful for identifying and maintaining inventory for a variety of products and goods. One of the disadvantages of a bar code system is that it may be difficult to read, depending on ambient light availability, and the bar codes position in relation to the reader.

Because of some of the limitations of bar codes and bar code readers, passive transponder systems have been developed. There are for example radio frequency transponders which require contact with a reader in order to be read. There are also radio frequency tag magnetic readers in which no contact is required. These magnetic RF tags may be read by a reader which activates a transmitter within an RF tag whenever the RF tag becomes disposed within the electromagnetic field generated by the RF tag reader. This causes a radio frequency signal to be transmitted which may then be received by the reader.

Thus, a typical prior art system utilizes an RF tag which when interrogated by RF energy from a hand-held unit, emits an RF signal serving to provide an identification of a product with which the tag is associated.

DISCLOSURE OF THE INVENTION

A preferred embodiment of the present invention is based on the use of a visible light beam to activate or interrogate a solid state record, herein referred to as a data tag so as to reflect its antecedent in the RF tag art. Where a laser beam is used, a desired data tag can be selected from other adjacent data tags by directing a laser beam so as to impinge on the selected tag. Where the tag is light sensitive, and selective to the wavelength of the laser beam, impingement of the beam can activate the data tag, e.g., to transmit its data wirelessly as with the conventional RF tag. The energy of the laser beam can provide operating power for the data tag, e.g. the intensity of the tag response signal being proportional to the duration of the incidence of the laser beam to minimize the production of, e.g., RF noise in the environment.

The laser light beam when directed to impinge on the data tag can adjust its spot size relative to the photosensitive area of the data tag so as to insure steady coupling and then be modulated to e.g. modify stored data in the data tag.

In the retail field, for example, where solid state records are to display information for retail customers( customers such as pricing information which can be readily changed, the system of the present invention can use, e.g., a laser beam to select a given information display record or data tag and to modify the display as desired. Further, the data tag can store product identification data which can be wirelessly interrogated (e.g., by a command signal transmitted by the laser beam), and can thus respond to a hand-held terminal device for inventory or reordering purposes. The photosensitive region of the data tag could be also sensitive to ambient light, e.g. retail store lighting, so as to store operating power.

In another embodiment of the present invention a reader is provided having a size and a shape which may be hand-held and is operably attached to a separate hand-held or pocket sized or belt attached or the like terminal for receiving, processing and storing information. The terminal may be hard wired or RF linked to the reader such that it may be utilized independently for other purposes when it is not operably coupled with an RF tag reader. Additionally, a conventional bar code reader may also be operably coupled with the terminal if desired.

In yet another embodiment of the information transducing system of the present invention the data tag is at least partially powered by the radiant energy beam of the tag reader unit such that the data tag is both activated and powered by the tag reader unit.

BRIEF DESCRIPTION OF THE DRAWINGS

FIG. 3 is a diagrammatic block diagram indicating functional components of the solid state circuit imbedded in the data tag of FIGS. 1 and 2;

FIGS. 4A and 4B illustrate a preferred method of two-way communication between the reader unit and the data tag, FIG. 4A showing the periodic transmission of visible laser light energy to the data tag FIG. 4B showing an exemplary location of a communication aperture or time window which has a given time duration and a given time spacing from the waveform of FIG. 4A, FIG. 4C illustrates the presence of a data pulse generated by the data tag within the time window of FIG. 4B, e.g. for representing a binary one data bit during such time window;

FIG. 5 illustrates the case where the "on" intervals of FIG. 4A are reduced, causing reduced energy transfer from the laser beam to the data tag, and consequent reduced intensity of the return data pulse from the data tag.

FIGS. 1 through 11 of U.S. Pat. No. 5,280,159, issued Jan. 18, 1994, are hereby incorporated herein by reference.

DETAILED DESCRIPTION

Figure 1:
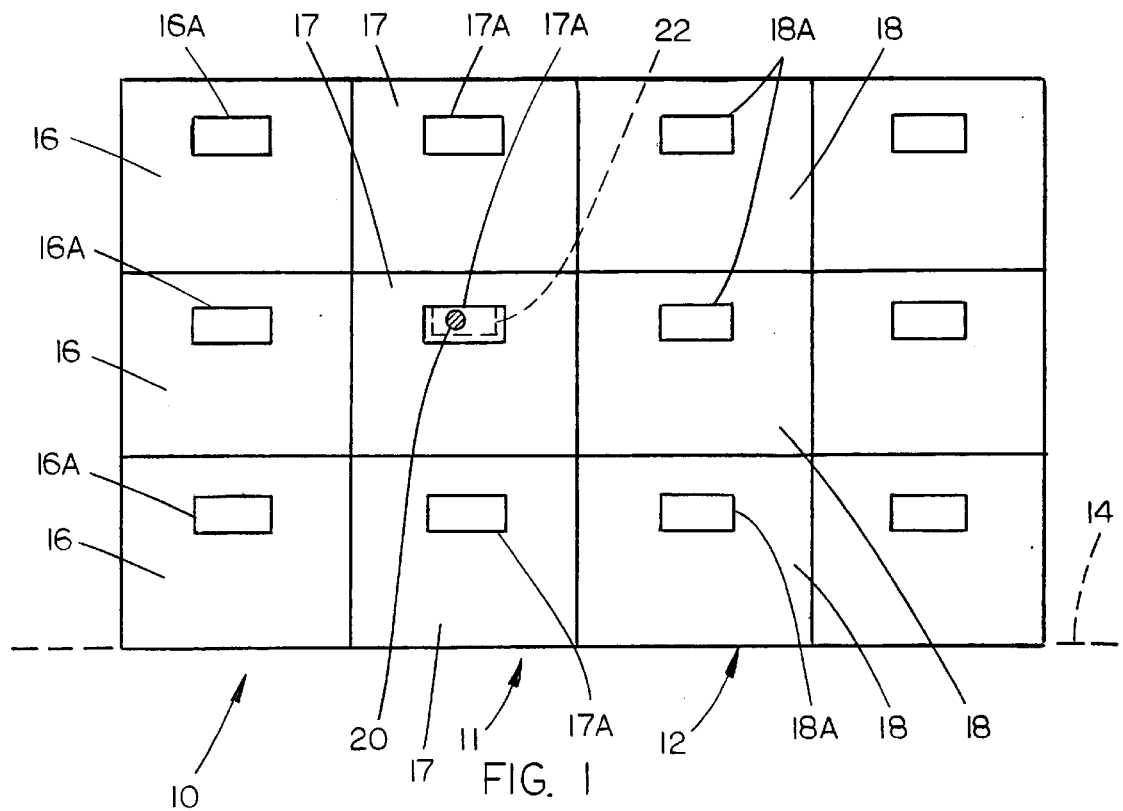
FIG. 1 is a diagrammatic elevational view showing adjoining stacks of articles with solid state records or data tags thereon which store product identification information for wireless transmission to a reader device in response to impingement of a laser beam of a given wavelength from the reader unit impinging upon a selected tag.

FIG. 1 shows a series of stacks such as 10, 11 and 12 rising vertically from support surfaces such as indicated at 14. A first stack 10 may comprise identical products 16 with respective identifying data tags 16A. A second stack 11 may comprise respective identical articles 17 with respective identical identifying data tags 17A, while a third stack 12 may comprise respective identical articles 18 with identical identifying data tags 18A.

In a known RF tag system, where different tags adjoin each other as illustrated in FIG. 1, it may be difficult under certain circumstances to reliably activate a desired tag or type of tag.

In accordance with a preferred embodiment of the present invention, a tag reader is provided with a laser beam source which produces a laser beam of size to conveniently select a desired data tag from different adjoining data tags. Thus, in FIG. 1, a spot from a laser beam tag reader does not greatly exceed the size of the entire data tag such as 17A, and further the laser beam is preferably of a visible wavelength, so that the spot 20 is readily visible to the user who is aiming the tag reader device.

Figure 2:
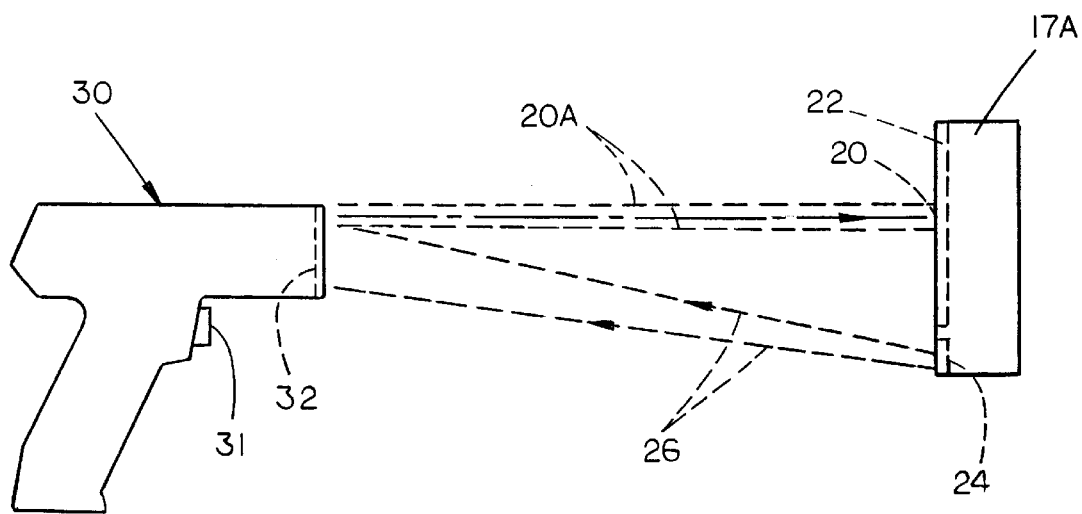
FIG. 2 is a diagrammatic side elevational view showing a data tag such as those illustrated in FIG. 1 with a photosensitive surface receiving an interrogating laser beam, and responsive thereto for wirelessly transmitting its stored data e.g. via an infrared, acoustic or RF transmitter.

Referring to FIG. 2, each data tag such as 17A is provided with a photosensitive surface area such as diagrammatically indicated at 22 and which may comprise a major portion of the surface of tag 17A as viewed in FIG. 1. In FIG. 2, the tag is shown provided with a transmitter diagrammatically indicated at 24. When a laser beam such as indicated at 20A is incident anywhere within the sensitive area 22, this may activate the data tag for example to transmit identifying data as indicated at 26, such data for example identifying the product 17 and differentiating such product from other products such as 16 and 18. The transmitter 24 provides wireless coupling with the reader unit, and may for example be an infrared, acoustic, or RF transmitter.

As indicated in FIG. 2, the reader may have a gun configuration such as is common in the laser bar code scanner art with a trigger controlling a laser diode or other preferably visible light laser source for projecting the beam 20A. Thus, the reader unit 30 is provided with a trigger as indicated at 31 and may have a window as indicated at 32 through which the beam 20A is emitted longitudinally so as to facilitate proprioceptive directing of the reader unit 31 by the user, or if desired, actual visual sighting, where the unit 30 is raised to shoulder height or the like and the user actually sights along the barrel of the unit.

An infrared return signal may be relatively omnidirectional, and, for example, the same window 32 may have a sufficient area to receive a substantial amount of the return signal energy which is then suitably optically concentrated and focused onto an optical e.g. infrared detector. For the case of an acoustical return signal, a portion of the window 32 may be replaced with an acoustical transducer for receiving the return acoustic signal. In the case of an RF return signal, the unit 30 may have an external or internal antenna, and in this respect may correspond with a conventional RF tag unit.

FIG. 3 shows the example of a data tag 17A with a photosensitive surface 22 which is not only sensitive to the wavelength of laser beam 22A, but is also suitable for converting ambient light surrounding the data tag and impinging on the data tag as represented by arrow 41 to produce operating power as indicated by arrow 42, for example, for storage to maintain a suitable integrated circuit memory such as RAM component 43. In this case, the laser beam may be amplitude modulated at a suitable frequency, and a frequency selective circuit 50 may respond to such modulated laser light energy to transmit a signal to a processor system such as microprocessor 51. For the purpose of returning an identification signal, stored data in the microprocessor may be transmitted to a response driver component 54 which activates a transmitter 55 of one of the types previously mentioned. Components 43, 50, 51, 54 and 55 may all be part of a relatively small solid state device such as represented by the data tags 16A, 17A and 18A in FIG. 1.

FIG. 4A shows the case where the e.g. amplitude modulated laser beam while aligned with a given tag is periodically turned off at intervals 61, 62 and 63 so as to initiate a timing cycle e.g. within processor circuit 51 and within the reader unit itself, resulting in the definition of a desired communication window as represented at 61A in FIG. 4B during which one data bit may be transmitted by components 51, 54 and 55. For example, the window 61A may have a time duration of one hundred nanoseconds, while a pulse 70, FIG. 4C, generated by the data tag may have a duration of twenty nanoseconds and be located within the time window 61A for presence of a binary one in the particular data frame represented by pulse 61 and window 61A.

Figure 6:
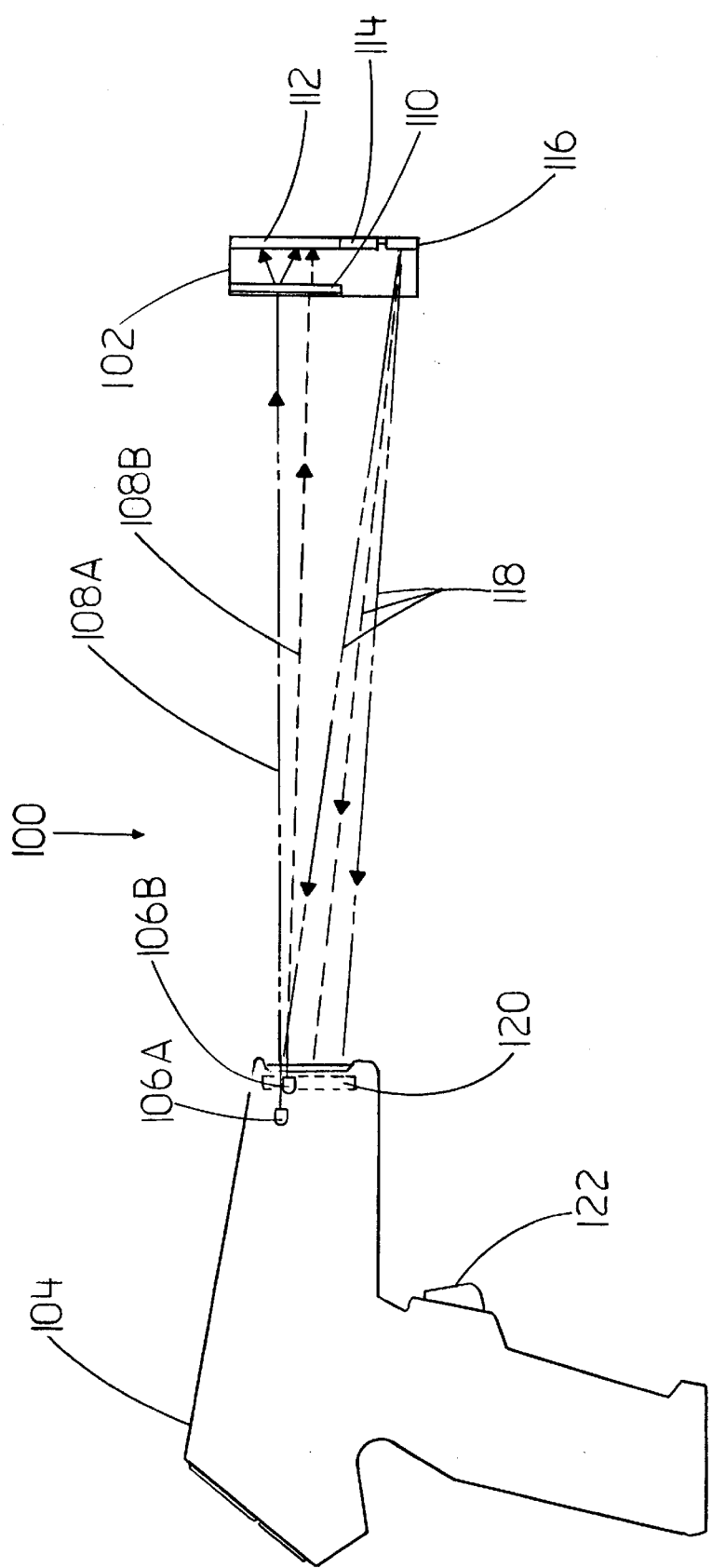
FIG. 6 illustrates an embodiment of the present invention which provides a data tag at least partially powered by the radiant energy beam of the tag reader unit such that the data tag is both activated and powered by the tag reader unit.

FIG. 6 illustrates an information transducing system 100 wherein the data tag 102 is at least partially powered by the tag reader unit 104 radiant energy beams (106A, 106B). The data tag 102 includes a rare earth (preferably Erbium) doped optical material 108. The tag reader unit 104 includes a first laser light source 106A capable of generating a first radiant energy beam 108A (preferably with a frequency in the green range), and a second laser light source 106B capable of generating a second radiant energy beam 108B (preferably with a frequency in the infrared range).

The data tag 102 includes an erbium doped optical material (or other suitable rare earth material) 110, a digital memory 114, and a radio frequency transmitter 116 (a photovoltaic cell 112 may also be provided). The first laser 106A operates at a characteristic frequency in the green range. The second laser 106B operates in the infrared range. The green laser provides photons that are more energetic than the infrared laser. (The photon energy is the product of the frequency and Planck's constant, thus, an increase in frequency will produce an increased photon energy level). The erbium absorbs some of the higher elevated energetic states that are metastable establishing a population inversion. These erbium atoms have at least two routes they may take to reach their ground state. They may directly emit light at the same wavelength they absorbed or they can emit light at intermediate frequencies making at least two emissions to reach their ground state. These allowed frequencies are well defined and not arbitrary. Preferably the infrared laser frequency just matches one of these allowed emission frequencies.

If the erbium doped optical material 110 is exposed to two incoming laser beams, energetically appropriate and of the correct allowed frequency, an interesting phenomenon predicted by Einstein takes place. The lower frequency infrared beam stimulates infrared emission from the metastable erbium atoms. Thus, there exists light amplification by stimulated emission and optical gain at the infrared frequency is also achieved. This emitted light is coherent and directed in the same direction as the incident stimulating infrared beam. A responder made of erbium doped optical material and backed by a mirror may be utilized to achieve an optical gain and reradiate more energy in the infrared back to the tag reader unit 104 than is incident upon it. This optical gain may be detected by a receiver 120. The responder may encode reradiated emissions by means of masks and polarizing filters.

We claim:

1. A data capture system capable of gathering data via activation of radio frequency tags, comprising:
   (a) a radio frequency data tag, comprising
      (i) a computer memory device capable of storing a data element,
      (ii) a radio frequency transmitter capable of communicating the data element as a radio frequency signal,
      (iii) a sensing device having a photosensitive surface, the photosensitive surface being located on said radio frequency data tag so as to be capable of sensing impingement of a light beam, said sensing device being capable of outputting an activation signal upon sensing impingement of a light beam on the photosensitive surface, and
      (iv) a computerized processor capable of receiving the activation signal from said sensing device and capable of communication with said radio frequency transmitter and said computer memory device; and
   (b) a data collection terminal, comprising
      (i) a radio frequency receiver, attached to an antenna, capable of receiving the radio frequency signal transmitted from said radio frequency data tag,
      (ii) a terminal computer memory device capable of storing a digital representation of the radio frequency signal received by said radio frequency receiver, and
      (iii) a light beam generator capable of projecting a light beam of a size suitable for impinging only upon the photosensitive surface of a desired radio frequency data tag and not upon the photosensitive surface of an adjacent undesired radio frequency data tag;
   wherein said radio frequency data tag is activated by the light beam and wherein said radio frequency data tag, upon activation by the light beam, transmits a data element via a different communications media, the radio frequency signal.

2. In the data capture system according to claim 1, wherein said radio frequency data tag further comprises an energy converter capable of converting a light beam impinging on said photosensitive surface, the light beam having been generated by said light beam generator, into operating power for said radio frequency data tag.

3. In the data capture system according to claim 1, wherein said light beam generator is a laser light source capable of generating a laser beam.

4. In the data capture system according to claim 1, wherein said radio frequency data tag further comprises an energy converter capable of converting ambient light impinging on said photosensitive surface into operating power for said radio frequency data tag.

5. In the data capture system according to claim 3, wherein said laser light source can be periodically turned off so as to initiate a timing cycle to define a desired communication window.

6. A data capture system capable of gathering data via activation of acoustical tags, comprising:
   (a) an acoustical data tag, comprising
      (i) a computer memory device capable of storing a data element,
      (ii) an acoustical signal transmitter capable of communicating the data element as an acoustical signal,
      (iii) a sensing device having a photosensitive surface, the photosensitive surface being located on said acoustical data tag so as to be capable of sensing impingement of a light beam, said sensing device being capable of outputting an activation signal upon sensing impingement of a light beam on the photosensitive surface, and
      (iv) a computerized processor capable of receiving the activation signal from said sensing device and capable of communication with said acoustical transmitter and said computer memory device; and
   (b) a data collection terminal, comprising
      (i) an acoustical transducer capable of receiving the acoustical signal transmitted from said acoustical data tag,
      (ii) a terminal computer memory device capable of storing a digital representation of the acoustical signal received by said acoustical transducer, and
      (iii) a light beam generator capable of projecting a light beam of a size suitable for impinging only upon the photosensitive surface of a desired acoustical data tag and not upon the photosensitive surface of an adjacent undesired acoustical data tag;
   wherein said acoustical tag is activated by the light beam and wherein said acoustical data tag, upon activation by the light beam, transmits a data element via a different communications media, the acoustical signal.

7. In the data capture system according to claim 6, wherein said acoustical data tag further comprises an energy converter capable of converting a light beam impinging on said photosensitive surface, the light beam having been generated by said light beam generator, into operating power for said acoustical data tag.

8. In the data capture system according to claim 6, wherein said light beam generator is a laser light source capable of generating a laser beam.

9. In the data capture system according to claim 6, wherein said acoustical data tag further comprises an energy converter capable of converting ambient light impinging on said photosensitive surface into operating power for said acoustical data tag.

10. In the data capture system according to claim 8, wherein said laser light source can be periodically turned off so as to initiate a timing cycle to define a desired communication window.

11. A data capture system capable of gathering data via activation of infrared data tags, comprising:
   (a) an infrared data tag, comprising
      (i) a computer memory device capable of storing a data element,
      (ii) an infrared signal generator capable of communicating the data element as an infrared signal,
      (iii) a sensing device having a photosensitive surface, the photosensitive surface being located on said infrared data tag so as to be capable of sensing impingement of a light beam, said sensing device being capable of outputting an activation signal upon sensing impingement of a light beam on the photosensitive surface, and
      (iv) a computerized processor capable of receiving the activation signal from said sensing device and capable of communication with said infrared signal generator and said computer memory device; and
   (b) a data collection terminal, comprising
      (i) a infrared signal detector capable of receiving the infrared signal transmitted from said infrared data tag,
      (ii) a terminal computer memory device capable of storing a digital representation of the infrared signal received by said infrared detector, and (iii) a light beam generator capable of projecting a light beam of a size suitable for impinging only upon the photosensitive surface of a desired infrared data tag and not upon the photosensitive surface of an adjacent undesired infrared data tag;

wherein said infrared data tag is activated by the light beam and wherein said infrared data tag, upon activation by the light beam, transmits a data element via a different communications media, the infrared signal.

12. In the data capture system according to claim 11, wherein said infrared data tag further comprises an energy converter capable of converting a light beam impinging on said photosensitive surface, the light beam having been generated by said light beam generator, into operating power for said infrared data tag.

13. In the data capture system according to claim 11, wherein said light beam generator is a laser light source capable of generating a laser beam.

14. In the data capture system according to claim 11, wherein said infrared data tag further comprises an energy converter capable of converting ambient light impinging on said photosensitive surface into operating power for said infrared data tag.

15. In the data capture system according to claim 13, wherein said laser light source can be periodically turned off so as to initiate a timing cycle to define a desired communication window.

16. In the data capture system according to claim 13, wherein said laser light source operates at a characteristic frequency in a green range, wherein said data collection terminal further comprises a second laser light source which operates in the infrared range, wherein said infrared data tag further comprises an erbium doped optical material such that light amplification by stimulated emission results when laser beams from said first and second laser light sources impinge on said erbium doped optical material.

17. In the data capture system according to claim 16, wherein said erbium doped optical material is backed by a mirror so as to direct the amplified infrared energy back to said data collection terminal.

* * * * *